United States Patent
Ikeda et al.

[11] Patent Number: 5,945,775
[45] Date of Patent: Aug. 31, 1999

[54] LAMP REFLECTING MIRROR COMPRISING POLYPHENYLENE SULFIDE, CALCIUM SILICATE WHISKERS AND A GRANULAR INORGANIC FILLER

[75] Inventors: Toshimasa Ikeda; Junji Toki; Yuji Yoshimoto, all of Shizuoka, Japan

[73] Assignee: Koito Manufacturing Co., Ltd., Tokyo, Japan

[21] Appl. No.: 08/815,926

[22] Filed: Mar. 13, 1997

[30] Foreign Application Priority Data

Mar. 14, 1996 [JP] Japan .................................. 8-057828

[51] Int. Cl.⁶ .............................. H01J 5/16; H01J 61/40; H01K 1/26; H01K 1/30
[52] U.S. Cl. ........................ 313/113; 313/110; 313/634; 313/636
[58] Field of Search .................................. 313/110, 112, 313/113, 493, 573–574, 580, 634–636; 523/212, 218–219; 524/425, 449, 609; 521/54

[56] References Cited

U.S. PATENT DOCUMENTS 4,885,321 12/1989 Nitoh et al. .............................. 523/219
5,589,524 12/1996 Ogita et al. ............................ 523/212

*Primary Examiner*—Sandra O'Shea
*Assistant Examiner*—Mack Haynes
*Attorney, Agent, or Firm*—Sughrue, Mion, Zinn, Macpeak & Seas, PLLC

[57] ABSTRACT

The invention provides a lamp reflecting mirror in which sufficient light reflecting characteristic (surface smoothness) can be obtained without application of any undercoat layer and in which heat resisting property, luminous intensity distributing performance (dimensional stability) and form retaining characteristic (material stiffness) at the time of adjustment of the optical axis can be satisfied at the same time. The lamp reflecting mirror is produced by injection molding a composition containing 30 to 50% by weight of polyphenylene sulfide resin, 5 to 30% by weight of calcium silicate whiskers, and 20 to 65% by weight of granular inorganic filler.

4 Claims, 1 Drawing Sheet

LAMP REFLECTING MIRROR COMPRISING POLYPHENYLENE SULFIDE, CALCIUM SILICATE WHISKERS AND A GRANULAR INORGANIC FILLER

FIELD OF THE INVENTION

The present invention relates to a lamp reflecting mirror and particularly relates to a lamp reflecting mirror suitable for use for a head lamp, a fog lamp, a spot lamp, or the like, provided on a two-wheeled vehicle, a four-wheeled vehicle, etc., and a method of producing the same.

BACKGROUND OF THE INVENTION

A lamp reflecting mirror, especially a car lamp reflecting mirror such as a head lamp, a fog lamp, or the like, uses an electric-light bulb of a very high luminance. Because the lamp reflecting mirror must endure high heat generated from a filament in use, a molding composition containing, as a base resin, a thermosetting resin such as unsaturated polyester or the like, or a heat-resisting thermoplastic resin such as polyether-imide, polyether-sulfone, polyphenylene-ether, heat-resisting polycarbonate, or the like, is used as a substrate for the reflecting mirror.

Although a polyester molding composition containing an inorganic filler such as calcium carbonate or the like in a glass fiber-reinforced unsaturated polyester molding composition is well known, use of a thermoplastic resin to form a reflecting mirror by a method such as injection molding or the like is advantageous from the viewpoints of reduction in the weight of the lamp, rationalization of productivity, and so on, so that the realization thereof is demanded.

Although the base resin to be used for a lamp reflecting mirror requires a heat resisting property to endure a heating temperature at the time of lighting of the lamp, if a thermoplastic resin composition is used for a lamp reflecting mirror, there has been such a problem that the reflecting mirror expands by the rise of heat in the lamp chamber at the time of lighting of the lamp so that the optical axis moves to make it impossible to obtain sufficient luminous intensity distributing performance because of the large linear expansion coefficient.

If a polyphenylene sulfide resin is used as the base resin, the heat resisting property is improved and the aforementioned problem in luminous intensity distributing performance at the time of lighting of the lamp can be solved. However, there is still a problem in the form retaining characteristic at the time of adjustment of the optical axis because the stiffness is still low.

On the other hand, a technique by which a glass fiber-reinforced polyphenylene sulfide molding composition is used so that a lamp reflecting mirror is obtained by injection molding is proposed.

The molding composition containing glass fiber is improved in the stiffness of the material to thereby improve the form retaining characteristic at the time of adjustment of the optical axis but is inferior in surface smoothness. Accordingly, it has been necessary that an undercoat layer is applied for improvement of the reflecting characteristic before the formation of a metal coating such as an aluminum coating or the like in order to make the metal coating deposit well.

In the undercoat layer, however, not only a problem arises such that the heat resisting property is lowered because the undercoat layer has a bad influence on heat resistance of the metal coating surface but also another problem arises such that good luminous intensity distributing performance cannot be obtained particularly in a level-difference reflecting mirror in which luminous intensity distribution is controlled only by the reflecting mirror, because an undercoat agent is reserved in level difference portions so that irregular reflection occurs. Furthermore, from the viewpoints of the influence of an organic solvent contained in an undercoat waste on environmental health upon application of an undercoating, improvement of productivity, and so on, there is demanded the appearance of a novel lamp reflecting mirror in which a sufficient light reflecting characteristic (surface smoothness) can be obtained without application of any undercoat layer and in which the aforementioned heat resisting property, luminous intensity distributing performance (dimensional stability) and form retaining characteristic can be satisfied at the same time.

Particularly in the high-strength lamp reflecting mirror of this type, when distortion occurs in the reflecting mirror surface, the reflecting mirror surface is roughened by the distortion so that light emitted from the electric-light bulb cannot be controlled accurately. Therefore, because a problem arises in the generation of a blinding flash to an oncoming vehicle, an unsatisfactory luminous intensity distributing standard, and so on, it is required that 1N. the reflecting mirror has an optically highly accurate reflecting surface. Therefore, it is necessary to develop a thermoplastic resin molding material by which a reflecting mirror substrate having excellent heat resisting property, dimensional stability, surface smoothness and stiffness can be provided.

SUMMARY OF THE INVENTION

It has been found that the aforementioned problems are solved by the provision of a lamp reflecting mirror obtained by injection molding a composition containing 30 to 50% by weight of polyphenylene sulfide resin, 5 to 30% by weight of calcium silicate whiskers, and 20 to 65% by weight of granular inorganic filler.

By molding a reflecting mirror using the aforementioned composition, excellent heat resisting property, dimensional stability, surface smoothness and stiffness can be obtained even in the case where a metal coating is provided directly without application of any undercoat layer.

Accordingly, the present invention further provides a method of producing a lamp reflecting mirror in which a reflecting mirror surface is formed from a metal coating without application of any undercoat layer on a substrate obtained by injection molding the aforementioned composition and then a top coat layer is applied onto the surface of the reflecting mirror.

According to the present invention, very good luminous intensity distributing performance can be obtained without occurrence of irregular reflection, particularly in a level-difference reflecting mirror in which luminous intensity distribution is controlled only by the reflecting mirror.

Figure 1:
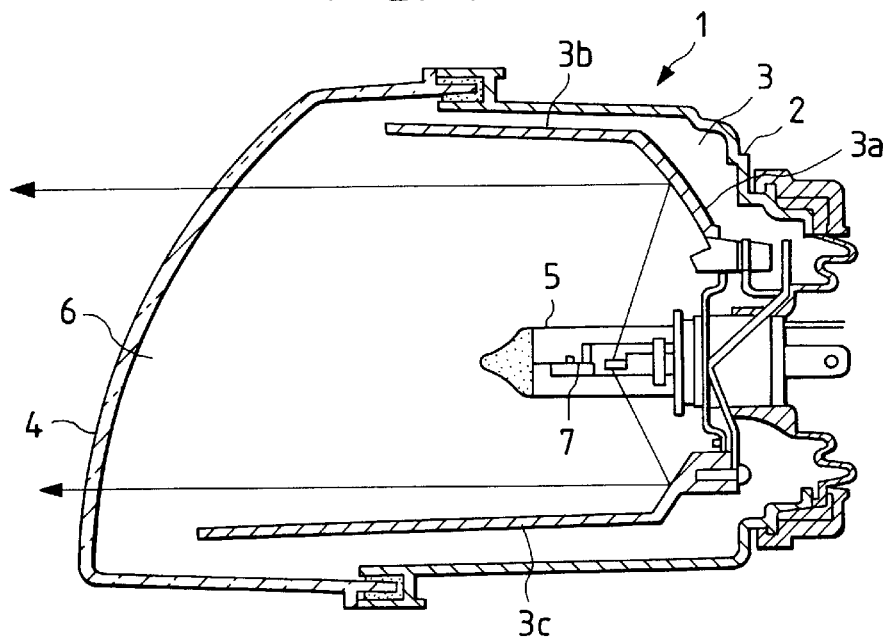
FIG. 1 is a sectional view showing a vehicle front lamp using a molding composition for a reflecting mirror substrate according to the present invention.

A description of the reference numerals is set forth below.

DETAILED DESCRIPTION OF THE INVENTION

The molding composition for the lamp reflecting mirror according to the present invention contains 30 to 50% by weight of polyphenylene sulfide resin as a heat-resisting thermoplastic resin, 5 to 30% by weight of calcium silicate whiskers as a reinforcement material for improving the deformation resistance of the resin against load both at room temperature and at a high temperature, and 20 to 65% by weight of granular inorganic filler as a filler for the double purpose of improving the heat resisting property of the resin greatly and reducing the cost of the final composition.

As the calcium silicate whiskers, a material having a diameter not larger than 3 μm and having a length not larger than 40 μm can be preferably used.

Examples of the granular inorganic filler include calcium carbonate, talc, mica, kaolinite, bentonite, montmorillonite, clay, graphite, carbon black, asbestos, aluminum hydroxide, etc. The granular characteristic is not particularly limited, but a size not larger than 5 μm is preferred.

Figure 2:
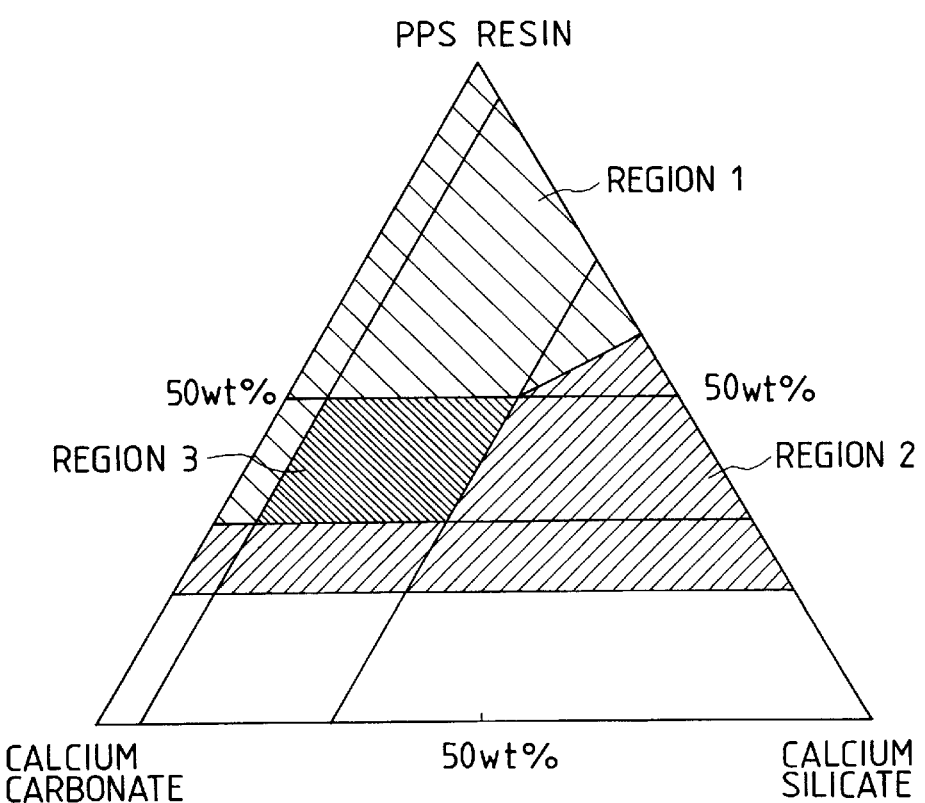
FIG. 2 is a composition view of the weight proportion of components contained in a material-resin mixture containing three components, polyphenylene sulfide resin (PPS), calcium silicate whiskers and calcium carbonate.

The amounts of the respective components contained in the molding composition according to the present invention are preferably selected to be in a region designated by Region 3 in a three-component graph as shown in FIG. 2. In the case where the amounts of the respective components are in Region 1, such surface smoothness that a metal coating such as an aluminum coating or the like can be formed directly is obtained in the reflecting mirror, but the form retaining characteristic is poor so that a form idea is required for improving the film thickness and the stiffness of a rib, a flange, etc. On the other hand, in the case of Region 2, the form retaining characteristic is good, but surface smoothness is poor so that an undercoat layer is required because no metal coating can be formed directly. Only in Region 3 defined in the present invention, both good stiffness and good surface smoothness can be provided at the same time.

Further, if necessary, internal releasing agents (for example, fatty acid metal salts such as zinc stearate, magnesium stearate, calcium stearate, aluminum stearate, etc.), pigments, polymerization inhibitors (for example, quinones, hydroquinones, phenols, organic and inorganic copper salts, amidines, hydrazines, quaternary ammonium salts, amines, nitro compounds, oximes, sulfur, polyhydric phenols, amine hydrochloride salts, etc.), viscosity bodying agents (for example, alkali-earth metal oxides such as magnesium oxide, calcium oxide, etc.), anti-oxidizing agents (for example, phenols, phospho compounds, thioethers, etc.), light stabilizers (for example, benzotriazoles, benzophenones, salicylates, cyanoacrylates, hindered amines, nickel complexes, etc.), flame retardants, antistats, and so on, may be suitably added to the molding composition according to the present invention.

The lamp reflecting mirror according to the present invention will be further described below with reference to FIG. 1.

FIG. 1 is a sectional view showing a typical vehicle front lamp in which a molding composition according to the present invention is used for a reflecting mirror.

In FIG. 1, the vehicle front lamp 1 has a lamp chamber 6 formed by a lamp body 2 and a front lens 4 attached to a front opening portion of the lamp body 2. A reflecting mirror 3 and an electric-light bulb 5 attached to the reflecting mirror are received in the lamp chamber 6. The reflecting mirror 3 is composed of a main reflecting surface 3a constituted by a radial surface, or the like, and flat surfaces 3b and 3c which are formed above, and below the main reflecting surface 3a so that the main reflecting surface 3a is disposed between the flat- surfaces 3b and 3c. After aluminum evaporation is applied to those surfaces to perform a reflecting treatment, topcoating is applied thereto.

By lighting the electric-light bulb 5, light emitted from a filament 7 is reflected forward by the reflecting surface 3a so that the light is thrown ahead of the vehicle. In this occasion, the temperature of the lamp chamber 6 is raised by heat generated from the electric-light bulb 5, so that particularly the surface temperature of the reflecting mirror 3 rises to about 180° C. Accordingly, not only must a material which tolerates these high temperatures be selected for the reflecting mirror, especially for the reflecting mirror surface, but also it is necessary that the reflecting mirror has an optically accurate reflecting surface.

The reflecting mirror 3 is formed by using a molding composition according to the present invention. A molding composition prepared by mixing and dispersing the aforementioned respective components is injected into a mold having a suitable shape and molded preferably by an injection molding method or an injection compression molding method to thereby form a reflecting mirror substrate. In this case, in order to reduce the pressure of a space in a mold cavity before injection, a tank connected to a vacuum source may be preferably connected to the mold so that air in the mold cavity is removed before injection.

Then, any activating treatment selected from a plasma treatment, a UV treatment, a corona discharge treatment, an organic solvent treatment, etc., may be preferably applied to the surface of the reflecting mirror 3. One kind of lacquer or a plurality of lacquers may be applied onto this primary coat. Then, a metal coating such as an aluminum coating or the like is formed thereon by a vacuum vapor deposition method or a sputtering method to thereby form a reflecting mirror surface. The lacquer is provided to be stuck both to the reflecting mirror surface and to the reflective aluminum coating. Polyester, polybutadiene, epoxy, acryl, alkyd resin, or the like is preferred as the lacquer. Further, a transparent protective coating having good heat resisting property, such as a paint type top coat, a plasma polymer film, a vapor deposition film, or the like, can be provided on the metal coating.

As described above, in the present invention, very good surface smoothness can be obtained even in the case where no undercoat layer is applied before the formation of the metal coating.

The present invention will now be described by way of examples, which should not be construed as limiting the invention in any way. Unless otherwise indicated, all parts, percents, ratios and the like are by weight.

Inventive Example 1 and Comparative Examples 1 to 3

Molding compositions A to D were prepared by dispersing and mixing the following components so that respective reflecting mirror substrates were produced by an injection molding method. Further, an activating treatment was applied to the substrates to provide a metal coating and, subsequently, a transparent protective coating was applied on each of the substrates to thereby produce lamp reflecting mirrors.

Composition A (present invention)

| | |
|---|---|
| polyphenylene sulfide resin (PPS) | 40% by weight |
| calcium silicate whisker | 20% by weight |
| granular calcium carbonate | 40% by weight |

-continued

| Composition B (glass fiber-reinforced unsaturated polyester) | |
|---|---|
| isophthalic acid type unsaturated polyester | 40% by weight |
| glass fiber | 20% by weight |
| granular calcium carbonate | 40% by weight |
| Composition C (granular filler-reinforced PPS) | |
| polyphenylene sulfide resin (PPS) | 40% by weight |
| granular calcium carbonate | 60% by weight |
| Composition D (non-reinforced PEI) | |
| polyether imide resin (PEI) | 100% by weight |

Table 1 shows results of an evaluation of the stiffnesses (bending moduli of elasticity) of these compositions and the mirror surface characteristics, heat resisting properties and luminous intensity distributing performances of the respective lamp reflecting mirrors obtained from the compositions.

TABLE 1

| | Inventive Example 1 | Comparative Example 1 | Comparative Example 2 | Comparative Example 3 |
|---|---|---|---|---|
| Composition | Composition A PPS + filler calcium silicate | Composition B glass-fiber reinforced unsaturated polyester | Composition C granular reinforced PPS | Composition D not-reinforced PEI |
| Stiffness kgf/cm² (bending modulus of elasticity) | 130,000 ○ | 135,000 ○ | 86,000 x | 34,000 x |
| surface smoothness | ○ undercoat is not required | x undercoat is required | ○ undercoat is not required | ○ undercoat is not required |
| Heat resistance °C. | 230 ○ | 200 Δ | 230 ○ | 200 Δ |
| Luminous intensity distributing performance *) 1) 2) | ○ ○ | x ○ | ○ ○ | Δ x |

*) Luminous intensity distributing performance
1) Level-difference form
2) optical axis change It is apparent from the results in Table 1 that satisfactory results are obtained in heat resisting property, light reflecting characteristic (surface smoothness), luminous intensity distributing performance (form accuracy) and form retaining characteristic (material stiffness) at the time of adjustment of the optical axis in the case where the composition according to the present invention is used.

Comparative Examples 4 to 7

Reflecting mirror substrates were produced in the similar manner as in Inventive Example 1, except that 20% by weight of calcium silicate whisker used as a reinforcing material was replaced by other respective reinforcing materials shown in Table 2. The bending moduli of elasticity and surface smoothness of the respective reflecting mirror substrates thus obtained are shown in Table 2 (incidentally, Table 2 also shows the results of Inventive Example 1 to make comparison easy).

TABLE 2

| | Kind of reinforcing material | Bending modulus of elasticity (kgf/cm²) | Surface smoothness (point) |
|---|---|---|---|
| Comparative Example 4 | glass fiber (6 μm diameter) | 141,000 | 0.7 |
| Comparative Example 5 | glass fiber (3 μm diameter) | 134,000 | 0.8 |
| Comparative Example 6 | whiskers of potassium titanate, potassium carbonate, etc.) | 115,000 | 0.9 |
| Comparative Example 7 | — (0%) | 105,000 | 0.9 |
| Inventive Example 1 | calcium silicate whisker | 130,000 | 0.9 |

Surface smoothness is expressed in a point value. Surface smoothness improves as the point value increases. A reflecting mirror requires a point value not smaller than 0.9. Further, a reflecting mirror preferably requires a bending modulus of elasticity not smaller than 120,000 kgf/cm².

In the case where glass fiber is used (Comparative Examples 4 and 5), an effect of improving the bending modulus of elasticity is obtained, but the required surface smoothness cannot be obtained. In the case where whiskers of potassium titanate, potassium carbonate, etc., are used (Comparative Example 6) or in the case where no reinforcing material is used (Comparative Example 7), surface smoothness is improved, but the bending modulus of elasticity cannot be improved.

It is, however, apparent that both surface smoothness and bending modulus of elasticity can be satisfied by using calcium silicate whiskers according to the present invention.

Inventive Example 2

The component proportion of polyphenylene sulfide resin (PPS), calcium silicate whisker and granular calcium carbonate used in Inventive Example 1 was changed variously to form reflecting mirror substrates. The surface smoothnesses and bending moduli of elasticity of the reflecting mirror substrates were measured.

TABLE 3

| | Composition (% by weight) | | | Surface smoothness (point) | Bending modulus of elasticity (kgf/cm²) |
|---|---|---|---|---|---|
| Region | PPS | calcium silicate | calcium carbonate | | |
| 1 | 40 | — | 60 | 1.0 | 98,000 |
| 2 | 40 | 40 | 20 | 0.6 | 175,000 |
| 3 | 40 | 20 | 40 | 0.9 | 135,000 |

FIG. 2 shows the weight proportion of components contained in a material-resin mixture consisting of three components, PPS, calcium silicate whiskers and calcium carbonate. In Region 1, a point value not smaller than 0.9 can be satisfied as a value required for surface smoothness, but the bending modulus of elasticity (not smaller than 120,000 kgf/cm²) of the target material cannot be obtained. In Region 2, a bending modulus of elasticity not smaller than 120,000 kgf/cm² can be obtained, but surface smoothness not smaller than 0.9 point cannot be obtained.

By selecting a composition in Region 3, surface smoothness not smaller than 0.9 point and a bending modulus of elasticity not smaller than 120,000 kgf/cm² can be obtained simultaneously.

According to the present invention, no undercoat is required because surface smoothness is excellent, so that a metal coating such as an aluminum coating or the like can be applied directly. Accordingly, because an undercoat layer having a bad influence on the heat resistance of the metal coating surface is not required, the heat resisting property is improved by a range of from about 30 to 40° C. In a level-difference reflecting mirror or the like in which luminous intensity distribution is controlled only by the reflecting mirror, irregular reflection occurs because an undercoat agent is reserved in level difference portions so that good luminous density distributing performance cannot be obtained. According to the present invention, though, because the metal coating can be applied directly, such irregular reflection is avoided so that very good luminous intensity distributing performance is obtained.

Furthermore, not only is the environmental characteristic excellent because the treatment of an organic solvent contained in the undercoat waste is omitted, but also the process can be simplified so that improvement of productivity can be expected because undercoat application/curing processes are omitted. Furthermore, by forming the topcoat layer as a dry type such as a plasma polymer film, the reflecting mirror can be produced entirely by an dry process so that it is easy to carry out automatic production.

Furthermore, there arise advantages in that deburring work can be omitted because no burrs occur, that a cleaning/drying process after shaping can be omitted, that recycling of granulation and re-molding can be made easily (thermosetting resin is generally hardly recycled), and so on, compared with the case where the conventional glass fiber-reinforced thermosetting resin (unsaturated polyester resin) is used.

Furthermore, because the form retaining characteristic (stiffness) of the reflecting mirror is good, the reflecting mirror is hardly deformed at the time of adjustment of the optical axis so that luminous intensity distributing performance hardly becomes poor. Accordingly, the luminous intensity distributing pattern is little deformed. Accordingly, there arise advantages that the thickness of the reflecting mirror can be reduced, that use of reinforcement ribs, beads, flanges, etc., can be omitted, that the linear expansion coefficient is small enough to eliminate the problem that the reflecting mirror is expanded by heat at the time of lighting of the lamp to move the optical axis, etc.

While the invention has been described in detail and with reference to specific embodiments thereof, it will be apparent to one of ordinary skill in the art that various changes and modifications can be made therein without departing from the spirit and scope thereof.

What is claimed is:

1. A lamp reflecting mirror obtained by injection molding a composition containing 30 to 50% by weight of polyphenylene sulfide resin, 5 to 30% by weight of calcium silicate whiskers, and 20 to 65% by weight of granular inorganic filler.

2. A lamp reflecting mirror according to claim 1, wherein said reflecting mirror has an overall surface that is split into a plurality of surfaces, wherein the surfaces have boundary portions that have a difference in level.

3. A lamp reflecting mirror according to claim 1, wherein a diameter of said calcium silicate whiskers is not larger than 3 µm, and a length thereof is not larger than 40 µm.

4. A lamp reflecting mirror according to claim 1, wherein a diameter of said granular inorganic filler is not larger than 5 µm.

* * * * *